US012565629B2

(12) United States Patent
Ellis et al.

(10) Patent No.: US 12,565,629 B2
(45) Date of Patent: Mar. 3, 2026

(54) LIGNIN DERIVATIVE FOR REDUCING DISHWASHER FILM

(71) Applicant: Borregaard AS, Sarpsborg (NO)

(72) Inventors: Ross Johannes Ellis, Sarpsborg (NO); Guro Elise Fredheim, Sarpsborg (NO)

(73) Assignee: Borregaard AS, Sarpsborg (NO)

( * ) Notice: Subject to any disclaimer, the term of this patent is extended or adjusted under 35 U.S.C. 154(b) by 518 days.

(21) Appl. No.: 17/797,408

(22) PCT Filed: Feb. 17, 2021

(86) PCT No.: PCT/EP2021/053853
§ 371 (c)(1),
(2) Date: Aug. 3, 2022

(87) PCT Pub. No.: WO2021/165298
PCT Pub. Date: Aug. 26, 2021

(65) Prior Publication Data

US 2023/0076035 A1 Mar. 9, 2023

(30) Foreign Application Priority Data

Feb. 17, 2020 (EP) .................................... 20157790
Nov. 26, 2020 (EP) .................................... 20210042

(51) Int. Cl.
*C11D 3/37* (2006.01)
*C11D 3/00* (2006.01)
(Continued)

(52) U.S. Cl.
CPC ............ *C11D 3/382* (2013.01); *C11D 3/0036* (2013.01); *C11D 3/08* (2013.01); *C11D 3/10* (2013.01);
(Continued)

(58) Field of Classification Search
CPC .............. C11D 1/30; C11D 1/80; C11D 3/382
(Continued)

(56) References Cited

U.S. PATENT DOCUMENTS 4,752,509 A 6/1988 Simonson et al.
6,288,015 B1 * 9/2001 Moeller ............ C11D 17/0017 510/180
(Continued)

FOREIGN PATENT DOCUMENTS

CN 102159624 A 8/2011
CN 103695187 A * 4/2014
(Continued)

OTHER PUBLICATIONS

CN103695187A translation (Year: 2014).*
(Continued)

*Primary Examiner* — Gregory R Delcotto
(74) *Attorney, Agent, or Firm* — Choate, Hall & Stewart LLP; William R. Haulbrook; Michael D. Schmitt

(57) ABSTRACT

The present invention relates to the use of lignin derivatives for reducing and/or preventing deposits on an object during a machine dishwashing process. Further, the present invention relates to a method for reducing and/or preventing deposits on an object and to a machine dishwasher detergent formulation comprising the lignin derivative described herein.

15 Claims, 3 Drawing Sheets

(51) Int. Cl.

| | |
|---|---|
| ***C11D 3/08*** | (2006.01) |
| ***C11D 3/10*** | (2006.01) |
| ***C11D 3/20*** | (2006.01) |
| ***C11D 3/34*** | (2006.01) |
| ***C11D 3/382*** | (2006.01) |

(52) U.S. Cl.
CPC ......... *C11D 3/2086* (2013.01); *C11D 2111/14* (2024.01)

(58) Field of Classification Search
USPC ......................... 510/220, 221, 473, 474, 505
See application file for complete search history.

(56) References Cited

U.S. PATENT DOCUMENTS

| | | | | |
|---|---|---|---|---|
| 2004/0121928 | A1* | 6/2004 | Price ........................ | C08H 6/00 510/247 |
| 2010/0075878 | A1 | 3/2010 | Gizaw et al. | |

FOREIGN PATENT DOCUMENTS

| | | | |
|---|---|---|---|
| CN | 103710170 | A | 4/2014 |
| CN | 103695187 | B | 7/2015 |
| CN | 105131306 | A | 12/2015 |
| JP | S61-268729 | A | 11/1986 |
| JP | H02-500039 | A | 1/1990 |
| JP | 2005-513300 | A | 5/2005 |
| JP | 2006-509895 | A | 3/2006 |
| JP | 2012-503080 | A | 2/2012 |
| WO | WO-88/02417 | A1 | 4/1988 |
| WO | WO-03/056099 | A1 | 7/2003 |
| WO | WO-2004/061067 | A2 | 7/2004 |
| WO | WO-2010/033743 | A1 | 3/2010 |
| WO | WO-2010/078930 | A2 | 7/2010 |

OTHER PUBLICATIONS

Translation (Year: 2014).*
Fredheim, G.E. et al., Molecular weight determination of lignosulfonates by size-exclusion chromatography and multi-angle laser light scattering, J. Chromatogr. A., 942(1-2):191-199 (2002).
International Search Report for PCT/EP2021/053853, filed Feb. 17, 2021, 3 pages, (mailed Apr. 29, 2021).
Written Opinion for PCT/EP2021/053853, filed Feb. 17, 2021, 7 pages, (mailed Apr. 29, 2021).

* cited by examiner

LIGNIN DERIVATIVE FOR REDUCING DISHWASHER FILM

FIELD OF THE INVENTION

The present invention relates to the use of lignin derivatives for reducing and/or preventing deposits on an object during a machine dishwashing process. Further, the present invention relates to a method for reducing and/or preventing deposits on an object and to a machine dishwasher detergent formulation comprising the lignin derivative described herein.

BACKGROUND OF THE INVENTION

A common problem, in particular in regions having "hard" water (i.e. water with high levels of calcium and/or magnesium ions), is the formation of insoluble deposits during a machine dishwashing process. This problem is particularly pronounced when high levels of carbonate and/or phosphate ions are present during the machine dishwashing process. Since carbonate is a major component of most dishwasher detergent formulations, usually in the form of sodium carbonate ("soda"), the formation of calcium carbonate deposits ("limescale") during a machine dishwashing process is particularly pronounced. For example, calcium and magnesium ions, which are present in the water, may interact with the carbonate and/or phosphate ions present in the detergent formulation and/or in the residual food material on the objects to be cleaned to result in white film- and spot-like deposits on the objects. Such deposits build up over repeated wash cycles and are clearly visible on glassware. Therefore, "anti-filming" additives are typically included in most dishwasher detergent formulations (or are added separately) to prevent and/or reduce such deposits.

Typically, anti-filming additives used in dishwasher detergents are synthetic anionic polymers, primarily polycarboxylates such as polyacrylates, polymethyacrylates or polyaspartates. Commercially available examples of such polymers include Acusol 445 (Rohm & Haas), which is a low molecular weight partially neutralized homo-polymer of acrylic acid. Another class of anti-filming additives are sulfonate/carboxylate copolymers.

Although effective, current anti-filming additives are synthetically derived mainly from petroleum-based chemicals. This, however, renders them unattractive for use in "eco-friendly" detergent formulations that tend to favor "plant-based" or "bio-based" ingredients. Therefore, there is currently a high demand for bio-based, eco-friendly detergent ingredients, including dishwasher anti-filming additives that can meet the performance of petroleum-based synthetics without compromising sustainability or cost.

Several attempts have been made to increase the bio-based carbon content of dishwasher anti-filming additives. For example, plant-derived polymeric materials (e.g. starch, proteins, lignin, cellulose) have been functionalized with carboxylate-containing chemical groups, specifically polyaspartate. These approaches, however, merely use the plant-based material as a template and still react the same with a petroleum-derived synthetic moiety that is known to inhibit film deposits. Thus, these approaches still rely on synthetic petroleum-derived chemicals to achieve the required anti-filming performance, and so do not provide a sustainable "100% bio-based" solution. Additionally, such modifications that involve reacting synthetic chemicals with bio-based polymers are expected to be expensive, compromising the cost-performance metric of the additive. As an example of an approach using expensive "laboratory" chemistry to make anti-filming materials. WO 2004/061067 proposes to functionalize a substrate (e.g. CMC, cellulose ethers, cellulose polymers, lignins, PVA, polyaspartates, starch, saccharides, gums etc.) with chloroacetic acid, chlorosulfonic acid in the presence of a catalyst, wherein this functionalized substrate, together with a surfactant, may be used as an anti-filming agent.

Thus, overall, cost-effective anti-filming solutions that have a bio-based carbon content of up to 100% are highly sought-after.

SUMMARY OF THE PRESENT INVENTION

Based on the above, it is an object of the present invention to provide for bio-based, sustainably sourced and highly effective anti-filming additives for machine dishwashing applications. Further, it is desired that the anti-filming additives can be prepared easily and cost-effectively in industrial-scale processes using naturally occurring materials, without the need to use expensive chemicals/reactants.

These and other objects is/are achieved by using a lignin derivative as defined in the claims for reducing and/or preventing deposits on an object during a machine dishwashing process.

In a first aspect, the present invention relates to the use of a lignin derivative as defined in the claims for reducing and/or preventing deposits on an object during a machine dishwashing process.

In a second aspect, the present invention relates to a machine dishwasher detergent formulation comprising a lignin derivative as described herein.

In a third aspect, the present invention relates to a method for reducing or preventing deposits on an object. Said method comprises the step of contacting said object during a machine washing process with a lignin derivative as described herein.

In a fourth aspect, the present invention relates the use of a lignin derivative as defined in the claims to lower the viscosity of detergent slurries during processing.

DETAILED DESCRIPTION OF THE INVENTION

The present invention is at least partly based on the surprising finding that the lignin derivatives as described herein are effective in reducing and/or preventing the formation of deposits on an object during a machine dishwashing process. In particular, it has been found that lignosulfonate as obtained from sulfite pulping is effective in reducing and/or preventing the formation of deposits on an object during a machine dishwashing process. Sulfonated native lignin and sulfonated Kraft lignin have found to be effective in in reducing and/or preventing the formation of deposits on an object during a machine dishwashing process.

"Sulfite pulping" is known in the art of wood/plant material processing. Sulfite pulping may be advantageously used for converting almost pure cellulose fibers from lignocellulosic biomass (i.e. plant matter) into wood pulp. This "pulping" is typically achieved by extracting lignin from lignocellulosic biomass in large pressure vessels called digesters by using various salts of sulfurous acid. During sulfite pulping, lignin molecules are sulfonated and thereby rendered negatively charged and generally water-soluble. In sulfite pulping, sulfonate groups are generally introduced at the aliphatic moieties of lignin. i.e. not at the aromatic moieties. Thus, lignosulfonate obtained from sulfite pulping does not or not significantly contain aromatic sulfonate groups but only or essentially only aliphatic sulfonate groups. In addition, carboxylate groups are introduced into native lignin during sulfite pulping.

In accordance with the present invention. "sulfite pulping" refers to the process of extracting or reacting native lignin or lignin in Kraft pulp, with at least one salt of sulfurous acid. The salts used in said pulping process are preferably sulfites ($SO_3^{2-}$) or bisulfites ($HSO_3^{-}$). By way of sulfite pulping, sulfonate groups are generally introduced at the aliphatic moieties of lignin. i.e. not at the aromatic moieties.

As referred to herein, an "aliphatic sulfonate group" is a sulfonate group that is bound to an aliphatic carbon atom, i.e. a carbon atom that is not part of an aromatic ring. In contrast, an "aromatic sulfonate group", as referred to herein, is a sulfonate group that is bound to a carbon atom that is part of an aromatic ring.

Figure 1:
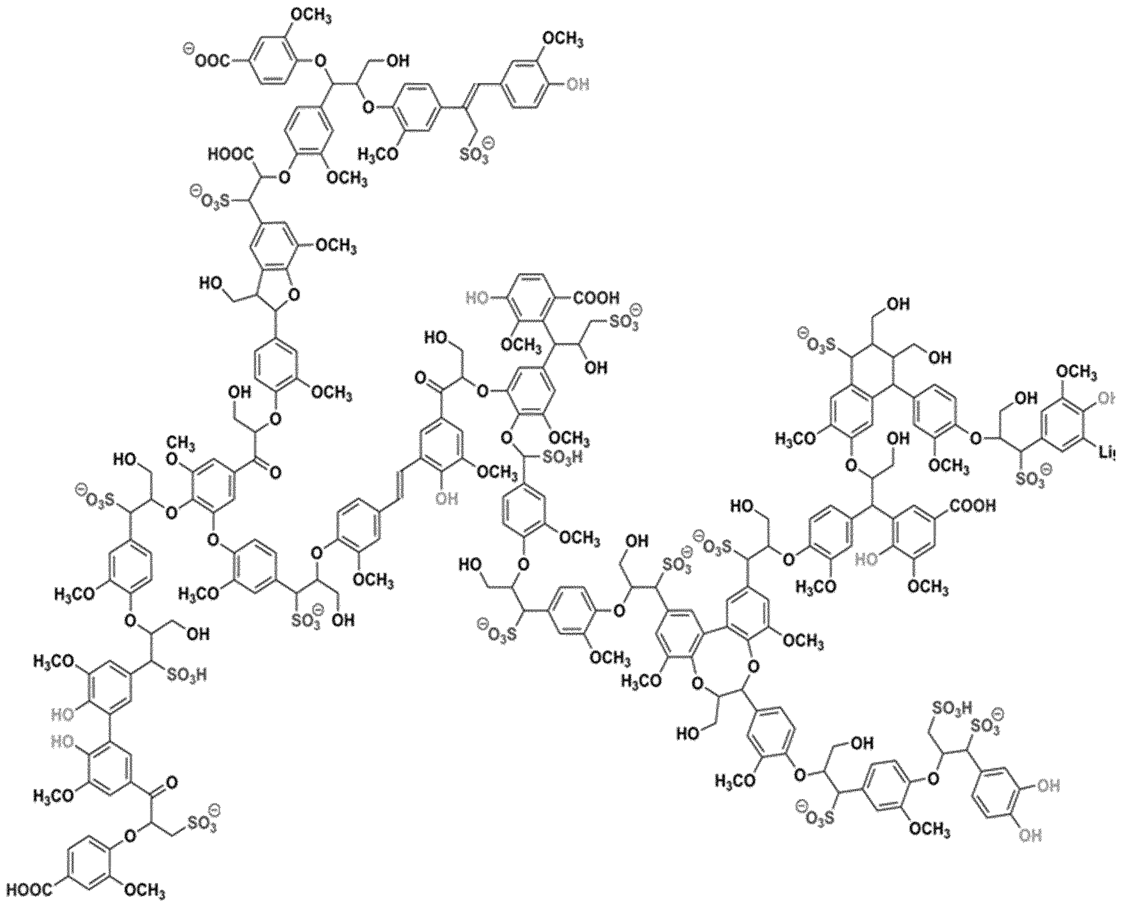
FIG. 1 shows an exemplary depiction of a lignosulfonate molecule as obtained from sulfite pulping.

Depending on the pulping conditions, feed material, and post processing, in particular sulfite pulping, the lignosulfonate polymer can have varying structures and chemical functionalities, such as molecular weight, degree of sulfonation, degree of conjugation, carboxylate groups (—COOR), phenolic groups, etc. Lignosulfonate therefore represents a highly diversified class of materials. An exemplary depiction of a lignosulfonate molecule as obtained from sulfite pulping is shown in FIG. 1.

In a first aspect, the present invention relates to the use of a lignin derivative as defined in claim 1 for reducing and/or preventing deposits on an object during a machine dishwashing process.

The lignin derivative in accordance with the present invention comprises both —COOR and sulfonate groups, wherein R is a cation, preferably an ammonium ion, hydrogen, an alkali metal ion, or an alkaline earth metal ion, or any mixture thereof.

Further in accordance with the present invention, the carbon atoms of said —COOR groups were already contained in the native lignin from which the lignin derivative is derived. That means that the —COOR groups are formed by oxidizing carbon atoms that have already been part of the native lignin from which the lignin derivative is derived. Or in other words, the —COOR groups have not been introduced by reacting native lignin or a lignin derivative with an additional —COOR group-containing molecule. Or in yet other words, the —COOR groups have not been introduced by grafting —COOR group-containing molecules onto the lignin or lignin derivative. A —COOR group-containing molecule that is used in the art for introducing —COOR groups is, for example, chloroacetic acid ( 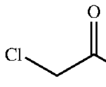 ).

Thus, if chloroacetic acid were used for forming the —COOR groups of the lignin derivative, then the carbon atom of the —COOR group would not have been contained in the native lignin from which the lignin derivative is derived but would have been contained in the (petroleum-based) chloroacetic acid it is immediately apparent that such a "laboratory chemistry" approach of introducing —COOR groups is labor intensive, costly, and requires the use of very often toxic, costly, and petroleum-based chemicals. Lignin derivatives prepared in this way are not susceptible to large-scale (industrial) processing and cannot be described as being eco-friendly, bio-based, or sustainably sourced. Hence, a functionalization with —COOR group-containing molecules, such as chloroacetic acid, is not within the scope of this invention.

The lignin derivative of the present invention may generally be denoted as "chemically modified" lignin comprising —COOR and sulfonate groups. These groups increase the polarity of the lignin derivative and render the lignin derivative water-soluble.

Preferably, the lignin derivative has a bio-based carbon content of more than 95%, more preferably more 98%, more preferably more than 99%, even more preferably more than 99.5%, most preferably 100%.

The bio-based carbon content is determined according to ASTM D8866-18 and is defined as follows:

$$\text{bio-based carbon content} = \frac{\text{number of bio-based carbon atoms}}{\text{number of total carbon atoms}} \times 100\%.$$

Preferably, the lignin derivative is part of a machine dishwasher detergent formulation as described in the second aspect.

In accordance with the present invention, the term "water-soluble" is meant to indicate that the lignosulfonate polyelectrolyte forms solutions with water and is present in water in amounts so that the resulting solution is clear to the eye and does not leave any significant precipitate when subjected to conventional filtering.

As described above, a common problem associated with machine dishwashing processes is the formation of insoluble deposits during machine dishwashing processes over time. Such deposits can be reduced and/or prevented by means of using the lignin derivative described herein during a machine dishwashing process. Deposits that form over time as a consequence of machine dishwashing processes are typically formed based on calcium and/or magnesium ions that are present in the wash water and carbonate and/or phosphate ions that are typically present in the machine dishwasher detergent formulation and/or in residual food material or soil of other origin. Such deposits are also referred to as "scale. Scale that forms from carbonate ions and calcium/magnesium ions is referred to as ° carbonate scale" and scale that forms from phosphate ions and calcium/magnesium ions is referred to as "phosphate scale". A well-known type of deposit occurring during dishwashing processes is limescale. However, since many countries, including the European Union and the United States, have banned or at least significantly limited the use of phosphates in detergent formulations, scale is nowadays mostly formed in the form of carbonate scale.

The deposits can have a variety of origins and chemical compositions and are typically described in the art as "films" and "spots".

Typically, dishware, tableware or glassware is cleaned in a machine dishwasher. Thus, the object on which deposits are reduced and/or prevented is preferably dishware, tableware or glassware.

Lignin (also referred to as "native lignin") is one of the most abundant organic materials in nature and provides strength and support to trees and other plants. Lignin is sometimes also referred to as the "glue" in the cellulosic skeleton. Chemically, lignin is a class of complex organic polymers.

Thus, in accordance with the present application, the term "lignin" relates to a biopolymer, respectively, a mixture of biopolymers, that is/are present in the support tissues of plants, in particular, in the cell walls providing rigidity to the plants. Lignin is a phenolic polymer, respectively, a mixture of a phenolic polymer. The composition of lignin depends on the plant and therefore vanes depending on the plant it is derived from. Lignin in its native form, i.e., as present in the plant, is hydrophobic and aromatic. No restrictions exist in regard to the source of the lignin.

In accordance with the present application the term "chemically modified" lignin and/or "lignin derivative" is to be understood to relate to any lignin that is no longer present in its native form, but has been subjected to a chemical derivatization process. Processes for making chemically modified lignin are generally known in the art, e.g. sulfite pulping.

One preferred example of a lignin derivative is lignosulfonate. Lignosulfonate is obtained when lignin, respectively, lignin-containing cellulosic biomass (also including "Kraft pulps", i.e. cellulosic biomass that has been subjected to the Kraft pulping process) is subjected to sulfite cooking. Thus, lignosulfonate is the organic salt product recovered from digestion of wood, e.g. acid or basic sulfite pulping with sulfurous acid (salts). Preferred lignosulfonates can thus be described as anionic polyelectrolyte polymers.

The term "lignosulfonate", as used within the context of the present application, refers to any lignin derivative which is formed during sulfite pulping of lignin-containing material, such as, e.g., wood, in the presence of, for example, sulfur dioxide and sulfite ions, respectively, bisulfite ions. For example, during the acidic sulfite pulping of lignin-based material, electrophilic carbon cations in the lignin are produced which are a result of the acid catalyzed ether cleavage. Thus, lignin may react, via these carbo-cations, with the sulfite, respectively, bisulfite ions under the formation of lignosulfonates.

Another example of a chemically modified lignin is "Kraft" lignin. Kraft lignin is precipitated from Kraft alkaline pulping liquors, in particular from Kraft process pulp making during which the lignin has been broken down from its native form present in the wood pulp, representing molecular fractions of the original biopolymer. Kraft lignin can therefore be described as precipitated, unsulfonated alkaline lignin. Kraft lignin differs structurally and chemically from lignosulfonate, e.g., in that Kraft lignin is not water-soluble. Thus, if Kraft lignin is to be used in the present invention, the Kraft lignin is further sulfonated. Hence, in one embodiment of the invention, the lignin derivative is sulfonated lignin obtained from Kraft lignin. In embodiments, such sulfonated Kraft lignin may be obtained when Kraft lignin is treated with alkali sulfite and alkylaldehyde at elevated temperature and pressure.

The lignin derivative that is used in all aspects of the present invention is now further described in detail:

The lignin derivative comprises sulfonate groups and —COOR groups. Therein, "R" is a cation, preferably an ammonium ion, hydrogen, an alkali metal ion, an alkaline earth metal ion, or any mixture thereof. The fact that "R" can be any mixture of an ammonium ion, hydrogen, an alkali metal ion, an alkaline earth metal ion is due to the fact that a lignin derivative comprises a multitude of —COOR groups, which may be present in different forms. For example, some —COOR groups may be present in the form of —COOH groups while others are present in a salt form, e.g. in the form of —COONa groups. In general, the —COOR group may be described as a carboxylic acid group or a salt thereof. However, as a person of skill in the art knows, at the time when the lignin derivative actually contacts the object during a machine dishwashing process, the lignin derivative is present in aqueous solution and thus, the —COOR may be present in deprotonated form (i.e. $—COO^-$). Such forms are also covered when the present invention refers to —COOR groups.

As referred to herein, a sulfonate group is a group having the chemical formula $—SO_3R'$, wherein R' is selected from the group consisting of an alkali metal ion or an alkaline earth metal ion. However, at that time when the lignin derivative actually contacts the object during a machine dishwashing process, the sulfonate groups are likely present in their free form (i.e. $—SO_3^-$). Such and similar scenarios are also covered when it is referred to a sulfonate group.

The lignin derivative in accordance with the present invention can be obtained in different ways.

According to one preferred embodiment, the lignin derivative is obtained by means of treating native lignin in a sulfite pulping process thereby introducing —COOR and sulfonate groups.

Preferably, the lignin derivative does not contain —COOR groups and/or sulfonate groups other than those derived from the sulfite pulping process. Further, preferably, the lignin derivative does not contain sulfonate groups and —COOR groups other than those derived from a sulfite pulping process.

In further preferred embodiments, this step of treating native lignin in a sulfite pulping process is followed by one or more post-pulping functionalization steps for decreasing the molecular weight and/or increasing the amount of —COOR groups.

As referred to herein, "lignosulfonate as obtained from sulfite pulping" is lignosulfonate having a chemical structure that is the result of subjecting native lignin from cellulose to sulfite pulping. Or in other words, "lignosulfonate as obtained from sulfate pulping" is lignosulfonate directly obtained from a sulfite pulping process without the application of any post-pulping functionalization steps. Thus, lignosulfonate obtained as a byproduct of cellulose production by means of sulfite pulping is a "lignosulfonate as obtained from sulfite pulping" within the meaning of the present invention.

As referred to herein, a "post-pulping functionalization step" is a chemical or physical treatment step that is applied subsequent to sulfite pulping and that alters the molecular structure of lignosulfonate as obtained from sulfite pulping. However, any step applied after sulfite pulping that merely increases the purity of lignosulfonate as obtained from sulfite pulping without altering its the chemical structure, e.g. a washing step and the like, is not a "post-pulping functionalization step" within the meaning of the present application.

Preferably, the one or more post-pulping functionalization steps for decreasing the molecular weight and/or increasing the amount of —COOR groups are an oxidation step or a thermal treatment step.

Preferably, the lignin derivative is obtained by treating lignosulfonate as obtained from sulfite pulping in a post-pulping oxidation step. That means that first lignosulfonate is prepared by treating native lignin in a sulfite pulping and then, the lignosulfonate as obtained from sulfite pulping is oxidized in a post-pulping oxidation step. It is to be understood that, in this case, no other post-pulping functionalizing steps are applied, except for washing and other purification steps that do not alter the molecular structure in any significant manner.

In preferred embodiments, the lignin derivative is lignosulfonate as obtained from sulfite pulping. That means that the lignin derivative is prepared by treating native lignin in a sulfite pulping process thereby forming lignosulfonate.

In embodiments, no (further) post-pulping functionalizing steps are applied in case the lignin derivative of the present invention is obtained by a sulfite pulping step. This also means that the lignin derivative does not contain sulfonate groups and —COOR other than those derived from the sulfite pulping process. In particular, this means that the lignin derivative does not contain aromatic sulfonate groups. This embodiment is particularly advantageous, because in this case, lignosulfonate as obtained as a byproduct of cellulose production by means of sulfite pulping can be used, thereby rendering the lignin derivative highly cost-efficient and eco-friendly. Sulfite pulping is advantageously used at an industrial-scale processing of cellulose-based biomass since the sulfite pulping is then part of an integrated process that not only yields lignosulfonate but also cellulose pulp that can be further processed to yield valuable products/chemistry platforms.

It has been found that the structure (in particular the molecular weight and the amount of —COOR groups) of lignosulfonate as obtained from sulfite pulping can be further fine-tuned, in preferred embodiments, by modifying the sulfite pulping conditions. In embodiment, a sulfite pretreatment step can be applied.

In a preferred embodiment, cellulosic biomass is used as a substrate in the present process, in particular lignocellulosic biomass, which does not require mechanical (pre) treatment, and wherein sulfite (pre)treatment ("cooking") is applied as the only (pre)treatment.

Sulfite cooking generally may be divided into four main groups: acid, acid bisulfite, weak alkaline and alkaline sulfite pulping. I In a preferred embodiment of the present invention, cellulosic biomass is cooked with a sulfite, preferably a sodium, calcium, ammonium or magnesium sulfite under acidic, neutral or basic conditions. This sulfite cooking dissolves most of the native lignin present in the cellulosic biomass as sulfonated lignin (lignosulfonate: water-soluble lignin), together with parts of the hemicellulose.

Sulfite pretreatment is preferably performed according to one of the following embodiments. Therein and throughout the present disclosure, the "sulfite pretreatment" is also referred to as "cook":

acidic cook (preferably $SO_2$ with a hydroxide, further preferably with $Ca(OH)_2$, NaOH. $NH_4OH$ or $Mg(OH)_2$), bisulfite cook (preferably $SO_2$ with a hydroxide, further preferably with NaOH, $NH_4OH$ or $Mg(OH)_2$).

weak alkaline cook (preferably $Na_2SO_3$, further preferably with $Na_2CO_3$) and alkaline cook (preferably $Na_2SO_3$ with a hydroxide, further preferably with NaOH).

In regard to the sulfite cooking, the respective disclosure of WO 2010/078930 with the title "Lignocellulosic Biomass Conversion" as filed on Dec. 16, 2009 is incorporated by reference into the present disclosure.

According to another preferred embodiment, the lignin derivative is prepared by sulfonating Kraft lignin, i.e. lignin that has already been chemically modified in a Kraft pulping process. In preferred embodiment, the sulfite cooking as described above is used to further modify Kraft lignin.

According to another preferred embodiment, either the lignin derivative as obtained from sulfite pulping/cooking as described herein and above, or the lignin derivative as obtained from the sulfonated Kraft lignin as described herein and above is subjected to one further chemical treatment step, wherein said further step is selected from at least one oxidation step and/or thermal treatment step, preferably at least one oxidation step.

This oxidation step increases the number of —COOR groups and/or decreases the molecular weight above and beyond what is already achieved in the sulfite pulping/cooking step. As shown in the experiments below, increasing the —COOR content and/or decreasing the molecular weight (MW) generally improves anti-filming performance.

In preferred embodiments, said oxidation step is selected from at least one of the following: oxidation with an air (oxygen) and/or a periodate, peroxide, ozone or the like, optionally at elevated temperature. TEMPO oxidation, optionally in the presence of an oxidation catalyst and other methods and agents known to the skilled person for oxidizing cellulosic biomass.

Preferably, the lignin derivative comprises —COOR groups in an amount of more than 4 wt. %, more preferably more than 8 wt. %, even more preferably more than 12 wt %, even more preferably more than 14 wt %, based on dry matter. The amount of —COOR groups is determined by potentiometric titration as described in Methods in Lignin Chemistry. Stephen Y. Lin and Carlton W. Dence, Springer-Verlag Berlin Heidelberg, 1992, p 458-464.

Preferably, the lignin derivative does not contain aromatic sulfonate groups and/or has not been treated with chlorosulfonic acid. It is also preferred that the —COOR groups are not derived from a reaction with chloroacetic acid.

It is further preferred that the lignin derivative has not been treated with chloroacetic acid at all. Further preferably, the lignin derivative does not comprise —COOR groups other than those where the carbon atom was already contained in the native lignin from which the lignin derivative is derived. That means that the —COOR groups are not formed by functionalizing lignin or a lignin derivative, such as lignosulfonate or Kraft lignin, with a —COOR group-containing molecule, such as chloroacetic acid.

The molecular weight (weight average, MW) of the lignin derivative is preferably less than 45,000 Da, or 2,000 Da to 45,000 Da, or less than 42,000 Da, or less than 31,000 Da, or less than 10,000 Da, or 2,000 Da to 42,000 Da, or 2,000 Da to 31,000 Da, or 2,000 Da to 10,000 Da, or 3,500 Da to 45,000 Da, or 3,500 Da to 42,000 Da, or 3,500 Da to 31,000 Da, or 3,500 Da to 10,000 Da. The molecular weight is determined by means of size exclusion chromatography as described in G. Fredheim et al., "Molecular weight determination of lignosulfonates by size-exclusion chromatography and multi-angle laser light scattering", *J Chromatogr A.*, 942, 2002, 191-199.

As shown in the examples, it has been found that a low molecular weight leads to particularly efficient film-reduction properties.

Thus, in general, a combination of a low molecular weight and a relatively high amount of —COOR groups is preferred.

According to a preferred embodiment, the lignin derivative has a molecular weight of less than 100000 Da and comprises —COOR groups in an amount of more than 4 wt % (based on dry matter).

According to another preferred embodiment, the lignin derivative has a molecular weight of less than 100000 Da and comprises —COOR groups in an amount of more than 8 wt. % (based on dry matter).

According to another preferred embodiment, the lignin derivative has a molecular weight of less than 100000 Da and comprises —COOR groups in an amount of more than 12 wt. % (based on dry matter).

According to another preferred embodiment, the lignin derivative has a molecular weight of less than 100000 Da and comprises —COOR groups in an amount of more than 14 wt. % (based on dry matter).

According to another preferred embodiment, the lignin derivative has a molecular weight of less than 50000 Da and comprises —COOR groups in an amount of more than 4 wt. % (based on dry matter).

According to another preferred embodiment, the lignin derivative has a molecular weight of less than 50000 Da and comprises —COOR groups in an amount of more than 8 wt. % (based on dry matter).

According to another preferred embodiment, the lignin derivative has a molecular weight of less than 50000 Da and comprises —COOR groups in an amount of more than 12 wt. % (based on dry matter).

According to another preferred embodiment, the lignin derivative has a molecular weight of less than 50000 Da and comprises —COOR groups in an amount of more than 14 wt. % (based on dry matter).

According to another preferred embodiment, the lignin derivative has a molecular weight of less than 25000 Da and comprises —COOR groups in an amount of more than 4 wt. % (based on dry matter).

According to another preferred embodiment, the lignin derivative has a molecular weight of less than 25000 Da and comprises —COOR groups in an amount of more than 8 wt. % (based on dry matter).

According to another preferred embodiment, the lignin derivative has a molecular weight of less than 25000 Da and comprises —COOR groups in an amount of more than 12 wt. % (based on dry matter).

According to another preferred embodiment, the lignin derivative has a molecular weight of less than 25000 Da and comprises —COOR groups in an amount of more than 14 wt. % (based on dry matter).

According to another preferred embodiment, the lignin derivative has a molecular weight of less than 20000 Da and comprises —COOR groups in an amount of more than 4 wt. % (based on dry matter).

According to another preferred embodiment, the lignin derivative has a molecular weight of less than 20000 Da and comprises —COOR groups in an amount of more than 8 wt. % (based on dry matter).

According to another preferred embodiment, the lignin derivative has a molecular weight of less than 20000 Da and comprises —COOR groups in an amount of more than 12 wt. % (based on dry matter).

According to another preferred embodiment, the lignin derivative has a molecular weight of less than 20000 Da and comprises —COOR groups in an amount of more than 14 wt. % (based on dry matter).

According to another preferred embodiment, the lignin derivative has a molecular weight of less than 15000 Da and comprises —COOR groups in an amount of more than 4 wt. % (based on dry matter).

According to another preferred embodiment, the lignin derivative has a molecular weight of less than 15000 Da and comprises —COOR groups in an amount of more than 8 wt. % (based on dry matter).

According to another preferred embodiment, the lignin derivative has a molecular weight of less than 15000 Da and comprises —COOR groups in an amount of more than 12 wt. % (based on dry matter).

According to another preferred embodiment, the lignin derivative has a molecular weight of less than 15000 Da and comprises —COOR groups in an amount of more than 14 wt. % (based on dry matter).

According to another preferred embodiment, the lignin derivative has a molecular weight of less than 10000 Da and comprises —COOR groups in an amount of more than 4 wt. % (based on dry matter).

According to another preferred embodiment, the lignin derivative has a molecular weight of less than 10000 Da and comprises —COOR groups in an amount of more than 8 wt. % (based on dry matter).

According to another preferred embodiment, the lignin derivative has a molecular weight of less than 10000 Da and comprises —COOR groups in an amount of more than 12 wt. % (based on dry matter).

According to another preferred embodiment, the lignin derivative has a molecular weight of less than 10000 Da and comprises —COOR groups in an amount of more than 14 wt. % (based on dry matter).

Preferably, the lignin derivative has a molecular weight of 3,500 Da or more, wherein each molecular weight bigger than 3,500 Da disclosed above may represent the upper molecular weight limit. That means that disclosed herein are molecular weight ranges from 3,500 Da to a molecular weight of more than 3.500 Da as mentioned above. For example, 10,000 Da, or 15,000 Da, or 20,000 Da (and so on) may form the upper limit of such a range.

Preferably, the lignin derivative is used in an amount of more than 0.02 g. preferably more than 0.5 g, more preferably more than 1.0 g, such as 0.02-20.0 g, 0.5-5.0 g, or 1.0-3.0 g. per wash cycle. These amounts have been shown to result in efficient film-reducing performances while at the same time allowing for the use of rather low amounts of lignin derivative. Increasing the amount of the lignin derivative above these ranges does not deteriorate the film-reducing performance, but does also not significantly improve the film-reducing performance. Thus, increasing the amount of lignin derivative above the recited ranges merely represents a waste of material without leading to any significant beneficial effect.

In a second aspect, the present invention relates to a machine dishwasher detergent formulation comprising a lignin derivative as described herein.

The machine dishwasher detergent formulation may be in any suitable form. For example, the machine dishwasher detergent formulation may be in the form of a tablet, a powder, a granule, a paste, a liquid or a gel.

Since the lignin derivative as described herein is particularly effective in reducing and/or preventing deposits during a machine dishwashing process, no further film-reducing components are required. Thus, the machine dishwasher detergent formulation may be free or essentially free of further anti-filming additives such as synthetic anionic polymers such as polycarboxylates, polyacrylates, polymethacrylates, polyaspartates.

Preferably, the lignin derivative is comprised in the machine dishwasher detergent formulation in an amount of 0.5-60.0 wt %, preferably 1.0-20 wt. %, more preferably 2.0-15 wt %, based on the total weight of the dishwasher detergent formulation.

In a third aspect, the present invention relates to a method for reducing and/or preventing deposits on an object, said method comprising the step of contacting said object during a machine dishwashing process with a lignin derivative as described herein.

Preferably, the step of contacting said object during a machine washing process with a lignin derivative as defined herein is a step of contacting said object with an aqueous solution comprising (i) calcium and/or magnesium ions, (ii) carbonate and/or phosphate ions and/or food deposits (fats, etc), and (iii) the lignin derivative as defined herein. Under these conditions, deposits in the form of carbonate and/or phosphate scale would form during the machine dishwashing process if the lignin derivative (and also other film-reducing agents) were absent.

More preferably, the step of contacting said object during a machine washing process with a lignin derivative as defined herein is a step of contacting said object with an aqueous solution comprising (i) calcium and/or magnesium ions. (ii) carbonate ions, and (iii) the lignin derivative as defined herein.

As already stated in the first aspect, the lignin derivative is preferably used in an amount of 0.02-20.0 g, preferably 0.5-5.0 g, more preferably 1.0-3.0 g per wash cycle.

Preferably, the object is not contacted with any other anti-filming additive such as synthetic anionic polymers, polycarboxylates, polyacrylates, polymethacrylates, and polyaspartates.

Preferably, the object is dishware, tableware or glassware.

As described above, the deposits are preferably carbonate scale and/or phosphate scale, more preferably carbonate scale.

In a fourth aspect, the present invention relates the use of a lignin derivative as defined in the claims to lower the viscosity of detergent slurries during processing.

Lignosulfonates generally lower the viscosity of mineral slurries and pastes. This allows for a more efficient processing of powders, granules and tablets. In one embodiment of the invention, the lignin derivative as defined in the claims is used to lower the viscosity of detergent slurries during processing. This gives a more efficient manufacturing as less water is needed to be removed during drying, it gives give improved spray dried detergent powders and it gives denser detergent tablets, etc.

The present invention is now further described by means of items 1-34:

Item 1. Use of a lignin derivative for reducing and/or preventing deposits on an object during a machine dishwashing process, wherein the lignin derivative comprises —COOR groups and sulfonate groups, wherein R is a cation, preferably an ammonium ion, hydrogen, an alkali metal ion, or an alkaline earth metal ion, or any mixture thereof, wherein the carbon atoms of said —COOR groups were already contained in the native lignin from which the lignin derivative is derived.

Item 2. The use according to Item 1, wherein the lignin derivative is part of a machine dishwasher detergent formulation as defined in any one of Items 24-27.

Item 3. The use according to any one of the preceding Items, wherein the lignin derivative is water-soluble.

Item 4. The use according to any one of the preceding Items, wherein the lignin derivative has a bio-based carbon content of more than 95%, preferably more than 98%, more preferably more than 99%, even more preferably more than 99.5%, even more preferably 100%, wherein said "bio-based" carbon content is determined according to ASTM D6866-18 and is defined as follows:

[number of bio-based carbon atoms]/[number of total carbon atoms]*100%

Item 5. The use according to any one of the preceding Items, wherein the lignin derivative is obtained by means of treating native lignin in a sulfite pulping step, wherein said sulfite pulping step is optionally followed by one or more post-pulping functionalization steps, for decreasing the molecular weight and/or for increasing the amount of —COOR groups.

Item 6. The use according to Item 5, wherein the one or more steps of decreasing the molecular weight and/or increasing the amount of —COOR groups is at least one oxidation step.

Item 7. The use according to item 5 or Item 6, wherein the lignin derivative is obtained by treating lignosulfonate as obtained from sulfite pulping in a post-pulping oxidation step.

Item 8. The use according to any one of Items 1-7, wherein the lignin derivative is sulfonated lignin as obtained from sulfite pulping of native lignin or from sulfite treatment of Kraft lignin.

Item 9. The use according to any one of Items 1-8, wherein the lignin derivative has not been subjected to an aromatic sulfonation step Item 10. The use according to any one of Items 5-9, wherein the lignin derivative does not contain sulfonate groups other than those derived from the sulfite pulping process.

Item 11. The use according to any one of items 5-10, wherein the lignin derivative does not contain —COOR groups other than those derived from the sulfite pulping process.

Item 12. The use according to any one of Items 5-11, wherein the lignin derivative does not contain sulfonate groups and —COOR groups other than those derived from the sulfite pulping process.

Item 13. The use according to any one of the preceding Items, wherein the lignin derivative does not contain aromatic sulfonate groups.

Item 14. The use according to any one of the preceding items, wherein the lignin derivative has not been treated with chlorosulfonic acid.

Item 15. The use according to any one of the preceding Items, wherein the sulfonate groups are not derived from a reaction with chlorosulfonic acid.

Item 16. The use according to any one of the preceding items, wherein the —COOR groups are not derived from a reaction with chloroacetic acid.

Item 17 The use according to any one of the preceding Items, wherein the lignin derivative has not been treated with chloroacetic acid.

Item 18. The use according to any one of the preceding Items, wherein the lignin derivative does not comprise —COOR groups other than those for which the carbon atom was already contained in the native lignin from which the lignin derivative is derived.

Item 19. The use according to any one of the preceding Items, wherein the —COOR groups are not formed by functionalizing lignin or a lignin derivative, such as lignosulfonate or Kraft lignin, with a —COOR group-containing molecule, such as chloroacetic acid.

Item 20. The use according to any one of preceding Items, wherein the lignin derivative is prepared by sulfonating, preferably by sulfite treatment, chemically modified lignin as obtained from a Kraft pulping process.

Item 21. The use according to any one of the preceding items, wherein the lignin derivative comprises —COOR groups in an amount of more than 4 wt,%, preferably more than 8 wt. %, more preferably more than 12 wt. %, even more preferably more than 14 wt. %, based on dry matter of lignin derivative.

Item 22. The use according to any one of the preceding items, wherein the molecular weight of the lignin derivative is less than 45,000 Da, or 2,000 Da to 45,000 Da, or less than 42,000 Da, or less than 31,000 Da, or less than 10,000 Da, or 2,000 Da to 42,000 Da, or 2,000 Da to 31,000 Da, or 2,000 Da to 10,000 Da, or 3,500 Da to 45,000 Da, or 3,500 Da to 42,000 Da, or 3,500 Da to 31,000 Da, or 3,500 Da to 10,000 Da.

Item 23. The use according to any one of the preceding Items, wherein the lignin derivative is used in an amount of from 0.02 to 20.0 g. preferably from 0.5 to 5.0 g, more preferably from 1.0 to 3.0 g, per wash cycle Item 24. A machine dishwasher detergent formulation comprising a lignin derivative as defined in any one of Items 1-23.

Item 25. The machine dishwasher detergent formulation according to Item 24, wherein the machine dishwasher detergent formulation is in the form of a tablet, a powder, a granule, a paste, a liquid or a gel.

Item 26. The machine dishwasher detergent formulation according to Item 24 or Item 25, wherein the machine dishwasher detergent formulation is free of further anti-filming additives such as synthetic anionic polymers, polycarboxylates, polyacrylates, polymethactylates, and polyaspartates.

Item 27. The machine dishwasher detergent formulation according to any one of Items 24-26, wherein the lignin derivative is comprised in the machine dishwasher detergent formulation in an amount of 0.5-80.0 wt. %, preferably 1.0-20 wt. %, more preferably 2.0-15 wt. %, based on the total weight of the dishwasher detergent formulation.

Item 28. A method for reducing and/or preventing deposits on an object, said method comprising the step of contacting said object during a machine dishwashing process with a lignin derivative as defined in any one of Items 1-23.

Item 29. The method according to Item 28, wherein the step of contacting said object during a machine washing process with a lignin derivative as defined in any one of Items 1-23 is a step of contacting said object with an aqueous solution comprising (i) calcium and/or magnesium ions. (ii) carbonate and/or phosphate ions and/or food deposits such as fats, and (iii) the lignin derivative as defined in any one of Items 1-23.

Item 30. The method according to Item 29, wherein the step of contacting said object during a machine washing process with a lignin derivative as defined in any one of Items 1-23 is a step of contacting said object with an aqueous solution comprising (i) calcium and/or magnesium ions, (ii) carbonate ions, and (iii) the lignin derivative as defined in any one of Items 1-23.

Item 31. The method according to any one of Items 28-30, wherein the lignin derivative is used in an amount of 0.02-20.0 g, preferably 0.5.5.0 g, more preferably 1.0-3.0 g per wash cycle.

Item 32. The method according to any one of Items 28-31, wherein the object is not contacted with any other anti-filming additive such as synthetic anionic polymers such as polycarboxylates, polyacrylates, polymethacrylates, and polyaspartates.

Item 33. The method according to any one of items 28-32, wherein the object is dishware, tableware or glassware.

Item 34. The method according to any one of Items 28-33, wherein the deposits are films or spots, preferably carbonate scale and/or phosphate scale, preferably carbonate scale.

EXAMPLES

Example 1: Scale Reduction Performance of Bio-Based, Lignosulfonates Obtained from Sulfite Pulping A base detergent composition was prepared. To that base detergent composition, different bio-based, water-soluble lignosulfonates (examples according to the invention) were added, or, in a comparative example, polyacrylate (2000 Da polyacrylic acid; commercially available from Acros Organics. CAS: 9003-01-4) as widely used as anti-filming agent in dishwasher detergent compositions. The base detergent formulation that was used for all examples consists of a builder and pH control ingredients as commonly used in automatic dishwasher detergent formulations. For purposes of the present examples, in order to assess performance, the hardness (i.e. calcium and magnesium content) of the wash water was set significantly higher than it would be encountered in any consumer dishwashing application and was selected to provide for very harsh conditions that result in significant filming in just 2 cycles.

Experimental Conditions:

BASE Detergent

The composition of the base detergent was as follows: 10 g $Na_2CO_3$: 5 g sodium citrate; 4 g sodium silicate, 1 g bleach.

Anti-Filming Agent

In the examples according to the invention, a range of lignosulfonate polymers was tested. The lignosulfonates were produced under various sulfite pulping conditions, from various hard wood (elm, cherry) and soft wood sources (Douglas fir, Norwegian spruce) with various post-pulping treatments, giving a range of MW and —COOH content.

In the comparative example, a 2000 Da polyacrylic acid (Acros Organics) was used as anti-filming agent.

Amount of Lignosulfonate Used Per Wash Cycle 4 g

Water Hardness

A total hardness of 1400 ppm was used, expressed as $CaCO_3$ with a Ca:Mg ratio of 4:1, added as chloride salts.

Soil 40 g margerine+10 g powder milk (smeared on the dishwasher door).

Dishwasher

Miele Glass Washer G7883.

Dishware

6×250 mL glass laboratory beakers were distributed in the top section of the dishwasher.

Number of Cycles

2

Procedure

Figure 2:
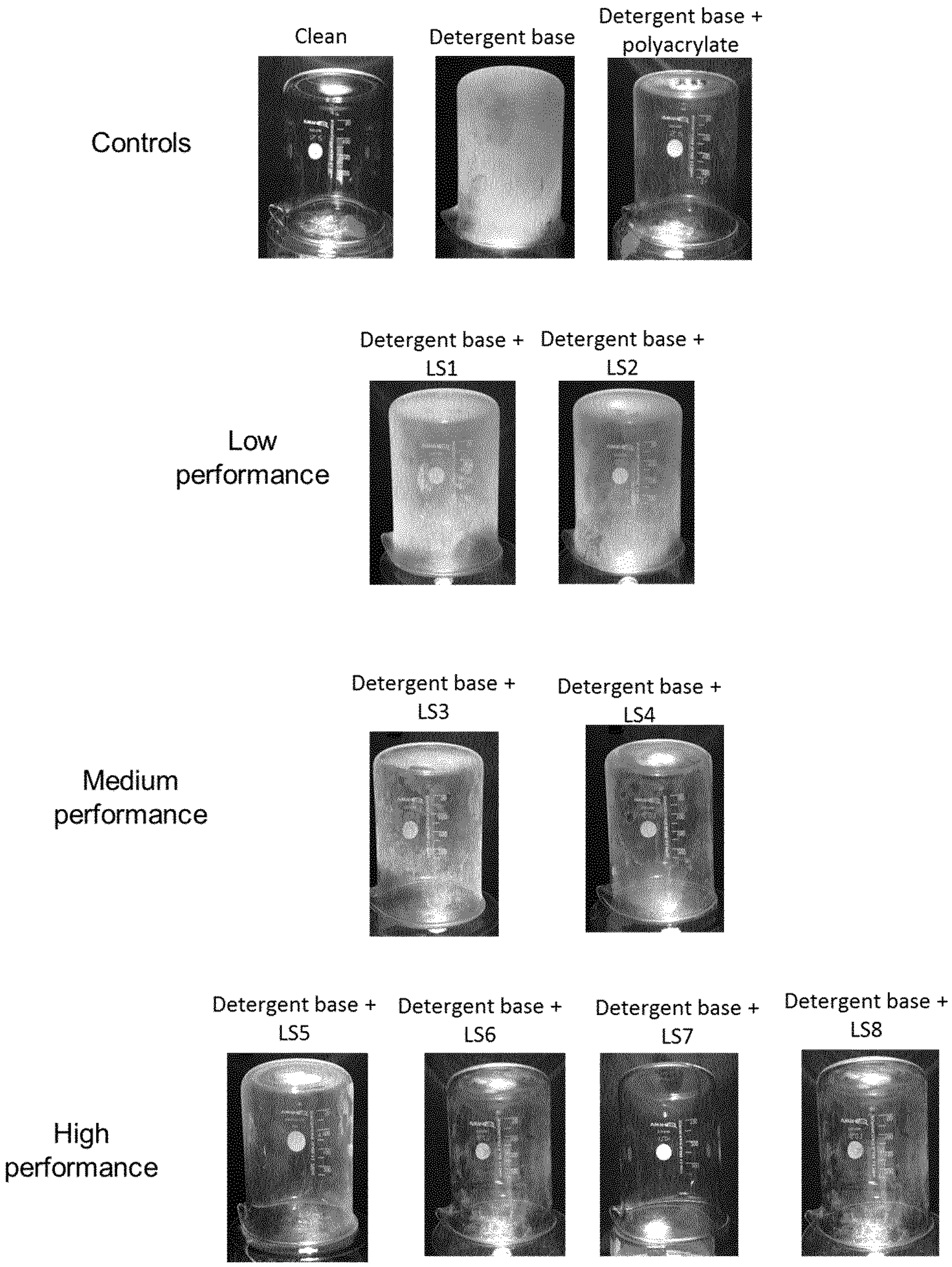
FIG. 2 shows the extent of film reduction on the beakers when using the base detergent with the different lignosulfonates and the polyacrylate anti-filming additives, in comparison to the film build up from base detergent without anti-filming additive.

Beakers were examined for filming after washing under the above conditions. Depending on the amount of film on the beakers, a comparative score was given to the performance of the anti-filming additive (low, medium, and high performance) FIG. 2 shows the extent of film reduction on the beakers when using the base detergent with the different lignosulfonates and the polyacrylate anti-filming additives, in comparison to the film build up from base detergent without anti-filming additive.

Figure 3:
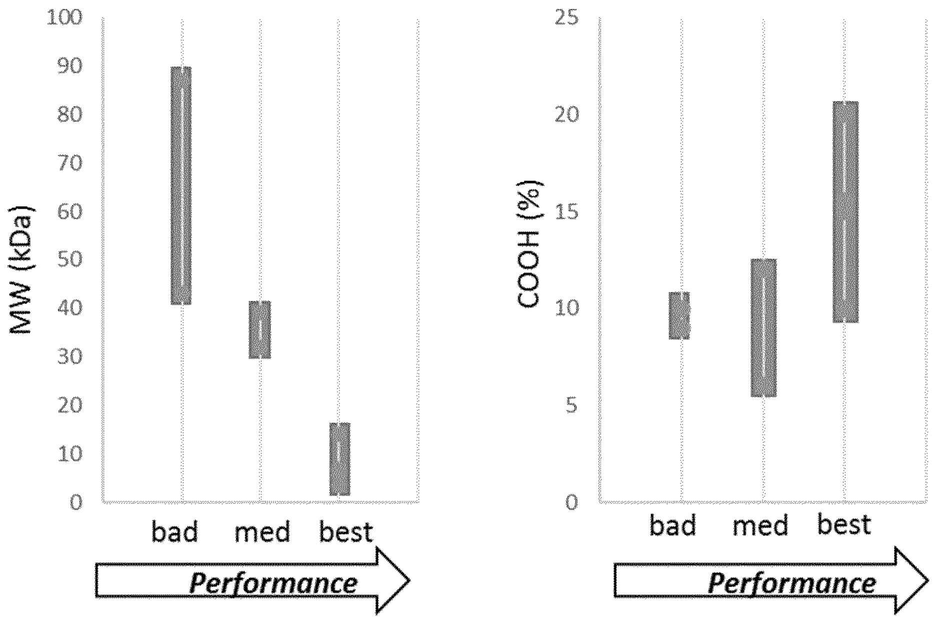
FIG. 3 shows the anti-filming performance of the various lignosulfonate polymers relative to the —COOH content and molecular weight (MW).

Table 1 and FIG. 3 show the anti-filming performance of the various lignosulfonate polymers relative to the —COOH content and molecular weight (MW).

TABLE 1

| Ligno-sulfonate sample | MW (kDa) | Amount of —COOH groups (wt./ based on dry matter) | Degree of sulfonation (wt./organic sulfur based on dry matter) | Perfor-mance |
|---|---|---|---|---|
| LS1 | 43 | 9 | 6 | low |
| LS2 | 87 | 10 | 5.8 | low |
| LS3 | 32 | 6 | 8 | medium |
| LS4 | 39 | 12 | 4 | medium |
| LS5 | 7 | 10 | 4.6 | medium |
| LS6 | 3.6 | 20 | 1.2 | high |
| LS7 | 14 | 15 | 6 | high |
| LS8 | 5.5 | 15.5 | 1.5 | high |

It can clearly be seen that the lignosulfonates that were found to have the best anti-filming performance are characterized by a high —COOR content and a comparatively low molecular weight

The invention claimed is:

1. A machine dishwasher detergent formulation comprising a lignin derivative for reducing and/or preventing deposits on an object during a machine dishwashing process, wherein the lignin derivative comprises —COOR groups and sulfonate groups, wherein R is a cation and wherein the carbon atoms of said —COOR groups were already contained in native lignin from which the lignin derivative is derived, wherein the lignin derivative has a molecular weight of less than 50,000 Da and comprises —COOR groups in an amount of more than 4 wt. %, based on dry matter, wherein the sulfonate groups are not derived from a reaction with chlorosulfonic acid and/or wherein the —COOR groups are not derived from a reaction with chloroacetic acid, and wherein the lignin derivative does not comprise —COOR groups other than those for which the carbon atom was already contained in the native lignin.

2. The machine dishwasher detergent formulation according to claim 1, wherein the lignin derivative has been obtained by treating the native lignin in a sulfite pulping step.

3. The machine dishwasher detergent formulation according to claim 1, wherein the lignin derivative has been obtained by treating lignosulfonate as obtained from sulfite pulping in a post-pulping oxidation step.

4. The machine dishwasher detergent formulation according to claim 1, wherein the lignin derivative is sulfonated lignin as obtained from sulfite pulping of native lignin or from sulfite treatment of Kraft lignin.

5. The machine dishwasher detergent formulation according to claim 2, wherein the lignin derivative does not comprise sulfonate groups and —COOR groups other than those derived from the sulfite pulping process.

6. The machine dishwasher detergent formulation according to claim 1, wherein the lignin derivative does not comprise aromatic sulfonate groups.

7. The machine dishwasher detergent formulation according to claim 1, wherein the —COOR groups are not formed by functionalizing lignin or a lignin derivative with a —COOR group-containing molecule.

8. The machine dishwasher detergent formulation according to claim 1, wherein the lignin derivative has been prepared by sulfonating chemically modified lignin as obtained from a Kraft pulping process.

9. The machine dishwasher detergent formulation according to claim 1, wherein the machine dishwasher detergent formulation is free of further anti-filming additives.

10. The machine dishwasher detergent formulation according to claim 1, wherein the lignin derivative is comprised in the machine dishwasher detergent formulation in an amount of 0.5-60.0 wt. % based on total weight of the dishwasher detergent formulation.

11. A method for reducing and/or preventing scale on an object, said method comprising a step of contacting said object during a machine dishwashing process with a lignin derivative, wherein the lignin derivative comprises —COOR groups and sulfonate groups, wherein R is a cation and wherein the carbon atoms of said —COOR groups were already contained in native lignin from which the lignin derivative is derived, wherein the lignin derivative has a molecular weight of less than 50,000 Da and comprises —COOR groups in an amount of more than 4 wt. %, based on dry matter, wherein the sulfonate groups are not derived from a reaction with chlorosulfonic acid and/or wherein the —COOR groups are not derived from a reaction with chloroacetic acid, and wherein the lignin derivative does not comprise —COOR groups other than those for which the carbon atom was already contained in the native lignin.

12. The method according to claim 11, wherein the step of contacting said object during a machine dishwashing process with the lignin derivative is a step of contacting said object with an aqueous solution comprising (i) calcium and/or magnesium ions, (ii) carbonate and/or phosphate ions and/or food deposits, and (iii) the lignin derivative.

13. The method according to claim 12, wherein the aqueous solution comprises (i) calcium and/or magnesium ions, (ii) carbonate ions, and (iii) the lignin derivative.

14. The machine dishwasher detergent formulation according to claim 10, wherein the lignin derivative is comprised in the machine dishwasher detergent formulation in an amount of 1.0-20 wt. % based on the total weight of the dishwasher detergent formulation.

15. The machine dishwasher detergent formulation according to claim 10, wherein the lignin derivative is comprised in the machine dishwasher detergent formulation in an amount of 2.0-15 wt. % based on the total weight of the dishwasher detergent formulation.

* * * * *